(12) United States Patent
Hochberg et al.

(10) Patent No.: US 8,718,441 B2
(45) Date of Patent: May 6, 2014

(54) PROGRAM TITLE DISPLAY WITH ANTI-AGING

(75) Inventors: Bradley Hochberg, San Jose, CA (US); Charles Alexander, Mountain View, CA (US); Andrew Marsh, San Francisco, CA (US)

(73) Assignee: TiVo Inc., Alviso, CA (US)

( * ) Notice: Subject to any disclaimer, the term of this patent is extended or adjusted under 35 U.S.C. 154(b) by 1496 days.

(21) Appl. No.: 11/852,184

(22) Filed: Sep. 7, 2007

(65) Prior Publication Data

US 2009/0067810 A1 Mar. 12, 2009

(51) Int. Cl.
*H04N 5/775* (2006.01)

(52) U.S. Cl.
USPC .......................................................... 386/230

(58) Field of Classification Search
USPC .................. 386/230, 239, 248, 307, 311, 312
See application file for complete search history.

(56) References Cited

U.S. PATENT DOCUMENTS

| | | | | |
|---|---|---|---|---|
| 6,553,180 B1 * | 4/2003 | Kikuchi et al. | ................ | 386/241 |
| 7,562,241 B2 * | 7/2009 | Nurmi | ........................... | 713/323 |
| 2004/0051705 A1 * | 3/2004 | Lee | ................................ | 345/204 |
| 2004/0190861 A1 * | 9/2004 | Chung et al. | .................... | 386/46 |
| 2005/0088442 A1 * | 4/2005 | Ota | ................................. | 345/473 |
| 2005/0088444 A1 * | 4/2005 | Tsubokawa | ................... | 345/501 |
| 2005/0156818 A1 * | 7/2005 | Tsuji | ............................... | 345/26 |
| 2007/0014541 A1 * | 1/2007 | Im | .................................. | 386/96 |

\* cited by examiner

*Primary Examiner* — Tat Chio
(74) *Attorney, Agent, or Firm* — Hickman Palermo Truong Becker Bingham Wong LLP (57) ABSTRACT

A method is provided to perform anti-aging techniques in an informational display. An informational display is located on the front bezel of a consumer recording device that displays information related to the content being recorded or played or the operation of the device. To increase the life of the display, displayed text is shifted within the display so that pixel use in the display is more evenly distributed with the pixels in the display. To determine the direction and shape of the shift, real-time calculations of pixel use are made or a simulator is used to compute the probable use of each pixel in the display over a certain period of time. Another anti-aging technique is to dim the display of information after a specified amount of time of display at normal brightness.

24 Claims, 7 Drawing Sheets

PROGRAM TITLE DISPLAY WITH ANTI-AGING

FIELD OF THE INVENTION

The present invention relates to anti-aging techniques for displays.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The introduction of the DVR to the consumer world has revolutionized the way users watch and record television programs. DVRs eliminate many of the complications of VCRs and the need for video tapes. DVRs record television programs on a hard drive that is capable of storing a large number of television programs. Because DVRs are usually box-like in shape, and are often found sitting on top of the television sets to which they are connected, DVRs typically are included in the broad category of devices now called "set-top boxes." Much like VCRs, DVRs receive one or more television signals (which may represent television programs and/or movies) as input from cables or satellite dishes, (or, in some cases, unlike VCRs, from broadband network connections) and also output television signals to a television set or other display.

A DVR's user can instruct the DVR to schedule, for recording, specified content that may be broadcasted or otherwise transmitted to the DVR at some future time. Thus, the user can schedule the automatic recording of the content in advance of the time that the DVR will receive the content. For example, the user can instruct the DVR to record unspecified content that will be broadcasted on a specified channel beginning at a specified date and time and ending at another specified time. For another example, the user can instruct the DVR to record a specified showing (on a specified channel, and beginning at a specified date and time) of a specified movie, specified event, or specified episode of a multi-episode television series. For another example, the user can instruct the DVR to record the next to-be-broadcasted instance of a specified movie, specified event, or specified episode of a multi-episode television series without specifying the date, time, or channel on which that instance will be broadcasted. For another example, the user can instruct the DVR to record all (or all first-run) episodes of a multi-episode television series on a specified channel without specifying the dates or times at which those episodes will be broadcasted. For another example, the user can instruct the DVR to record all (or all first-run) instances of movies, events, or episodes of a multi-episode television series that are associated with a specified keyword, a specified actor, and/or a specified director without specifying the titles, channels, or broadcasting times of those instances.

Typically, when a DVR is recording a television program, a LED red light is illuminated to indicate to the user that the DVR is recording the television program. However, this only indicates to the user that the DVR is recording a television program at the proper time. The user is not able to determine whether the television program recorded is the program that is desired. Other LED lights may be used to indicate different functions on the DVR depending upon the implementation.

In addition, a DVR may have more than one tuner capable of recording more than one television show at a time. Under this circumstance, a single LED light indicating recording does not inform the user that more than one recording is being made, much less indicating which particular television shows are being recorded.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
   1.0 General Overview
   2.0 Structural Overview
   3.0 Informational Display
      3.1 Anti-Aging Techniques
         3.1.1 Shifting Displayed Items
         3.1.2 Simulator
         3.1.3 Dimming
   4.0 Implementation Mechanisms

1.0 General Overview

The needs identified in the foregoing Background, and other needs and objects that will become apparent from the following description, are achieved in the present invention, which comprises a program title display and methods for anti-aging on the program title display.

In an embodiment, program title information is displayed to users on a display panel as the DVR is recording a television program. The display panel may display a variety of information in addition to the television program title that is being recorded. Examples of information displayed may include, but is not limited to, the television program title that is being played, a function or operation being performed by the DVR, or a clock displaying the current time. Other information may also be displayed depending upon the type of display used. The logo of the television show, television station, or network being watched, played, or recorded may also be displayed.

Many displays that are implemented use pixels to form the display area. Unfortunately, after continued use, pixels may burn out or malfunction. In situations where the same particular pixels are used continuously (such as the ":" when displaying time), the particular pixels would burn out much faster than other pixels with less use. This leads to incorrect, or unattractive, displays of information.

In order to lengthen the life of a display, anti-aging mechanisms may be employed. In an embodiment, the display of information on the display panel is moved and/or rotated throughout the display area in order to more evenly distribute the use of particular pixels. In another embodiment, the display of information is illuminated with less brightness after a specified period of display on the panel. By shifting the information on the display panel and also decreasing the intensity of the displayed information after a specified amount of time, the display generally has a much longer operational period.

2.0 Structural Overview

Figure 1A:
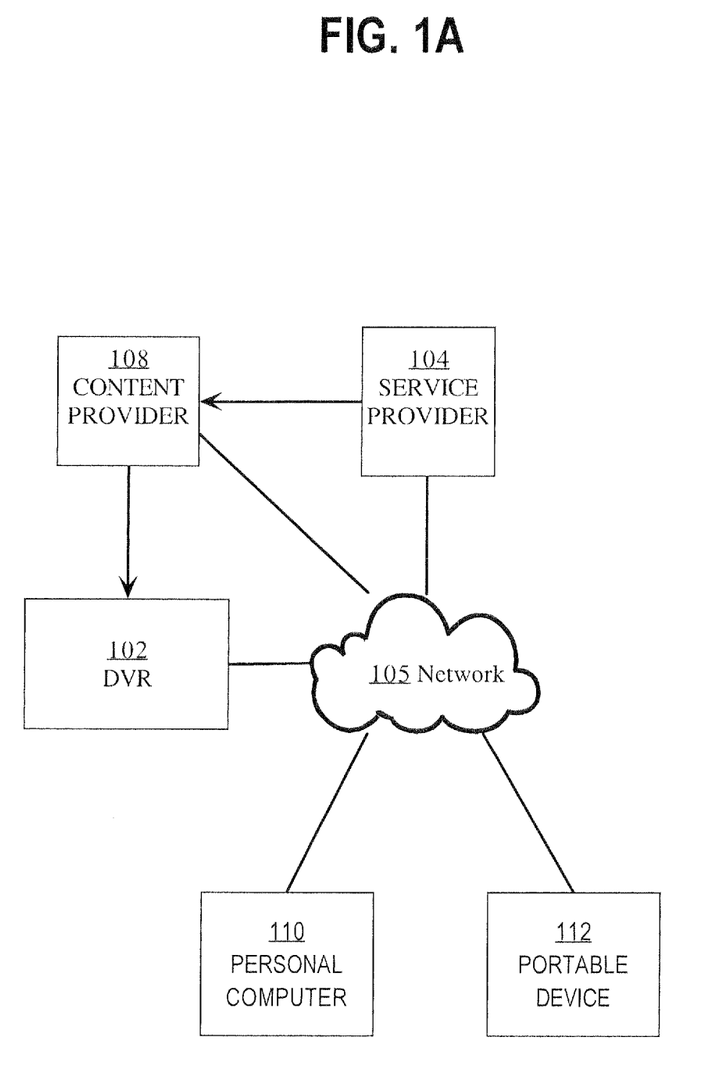
FIG. 1A is a block diagram illustrating a network with content and service providers for a DVR, according to an embodiment of the invention.

FIG. 1A illustrates a network with content and service providers for a DVR, according to an embodiment. The system contains DVR 102 which is communicatively coupled to network 105 through any communication interface, such as an Ethernet interface or wireless communications port. The functionality of a DVR is typified in U.S. Pat. No. 6,233,389 which is owned by the Applicants and is hereby incorporated by reference. The system also includes service provider 104, content provider 106, personal computer 108 and portable device 110.

Personal computer 108 may be a personal computing device, such as a desktop computer or laptop computer, and is also coupled to network 105 through any communications interface, including wireless. Portable device 110 may be any handheld computing device, cellular phone, portable media player, or any other portable device capable of displaying multimedia content and is also coupled to network 105 through any communications interface, including wireless. DVR 102, personal computer 108, and portable device 110 each communicate with service provider 104 through network 105. In another embodiment, DVR 102, personal computer 108, and portable device 110 each communicate with content provider 110 through network 105.

Network 105 may be implemented by any medium or mechanism that provides for the exchange of data between devices in the communication system. Examples of network 105 include, without limitation, a network such as a Local Area Network (LAN), Wide Area Network (WAN), the Internet, one or more terrestrial, satellite or wireless links, etc. Alternatively or additionally, any number of devices connected to network 105 may also be directly connected to each other through a communications link.

In one embodiment, content provider 106 provides broadcast program content to DVR 102 via cable, satellite, terrestrial communication, or other transmission method. Broadcast program content may include any multimedia content such as: audio, image, or video content. In another embodiment, content provider 106 provides multimedia content, such as any downloadable content, through network 105 to DVR 102, personal computer 108, or portable device 110.

In one embodiment, DVR 102 communicates with service provider 104, which provides program guide data, graphical resources (such as fonts, pictures, etc.), service information, software, advertisements, event identification data, and other forms of data that enable DVR 102 to operate independently of service provider 104 to satisfy user interests.

In another embodiment, content provider 106 may provide, to service provider 104, content data or any metadata, including promotional data, icons, web data, and other information. Service provider 104 may then interpret the metadata and provide the content data metadata to DVR 102, personal computer 108, or portable device 110.

Figure 1B:
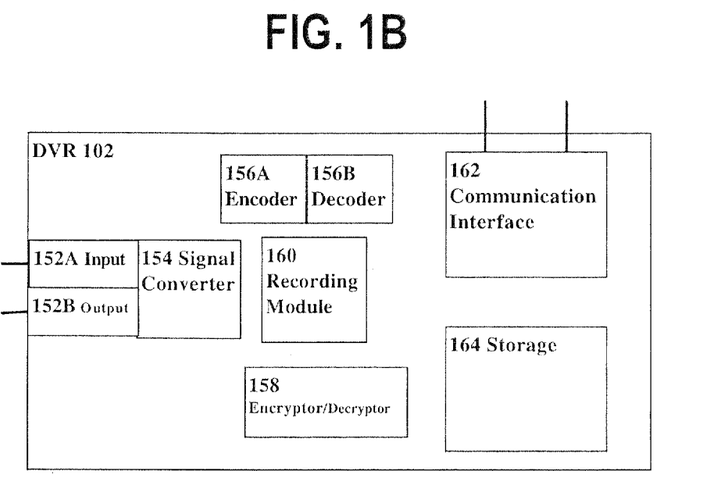
FIG. 1B is a block diagram illustrating a general overview of the components of a Digital Video Recorder (DVR), according to an embodiment of the invention.

Referring to FIG. 1B, in an embodiment, DVR 102 generally comprises a plurality of components, signified by Signal Converter 154, that are necessary to digitize an analog television signal and convert it into a digital data stream or accept a digital data stream. DVR 102 receives broadcast signals from an antenna, from a cable TV system, satellite receiver, etc., via Input 152A. Input 152A may comprise a plurality of tuning modules that allow a plurality of signals to be received and recorded simultaneously.

Recording Module 160 records the incoming data stream by storing the digital data stream on at least one storage facility, signified by Storage 164 that is designed to retain segments of the digital data stream. Storage 164 may also be used to store back ups of processed data that are associated with the user of the DVR. A Signal Converter 154 retrieves segments of the data stream, converts the data stream into an analog signal, and then modulates the signal onto a RF carrier, via Output 152B, through which the signal is delivered to a standard TV set. Output 152B may alternatively deliver a digital signal to a TV set or video monitor. For example, DVR 102 may utilize a Digital Visual Interface port (DVI) for sending digital signals to a TV via a DVI cable.

DVR 102 also includes a Communication Interface 162, through which the DVR 102 communicates with Network 105 via Ethernet, wireless network, modem, or other communications standard. Further, DVR 102 may be integrated into a TV system such that the components described above are housed in a TV set capable of performing the functions of each component of DVR 102.

In another embodiment, DVR 102 generally comprises a plurality of components necessary to receive, record, store, transfer and playback digital data signals from a plurality of sources, such as a PC, a DVR, a service provider, or content server. DVR 102 can transfer digital data signals to another DVR or PC. DVR 102 may encode or decode digital signals via Encoder 156A and Decoder 156B into a plurality of formats for playback, storage or transfer. DVR 102 can also encrypt or decrypt digital data signals using Encryptor/Decryptor 158 for storage, transfer or playback of the digital data signals.

In one embodiment, DVR 102 communicates with Service Provider 103, which provides program guide data, graphical resources such as brand icons and pictures, service information, software programs, advertisements, and other forms of data that enable DVR 102 to operate independently of the Service Provider 104 to perform autonomous recording functions. Communication between DVR 102 and Service Provider 104 utilizes a secure distribution architecture to transfer data between the DVR 102 and the Service Provider 104 such that both the service data and the user's privacy are protected.

3.0 Informational Display

Figure 2:
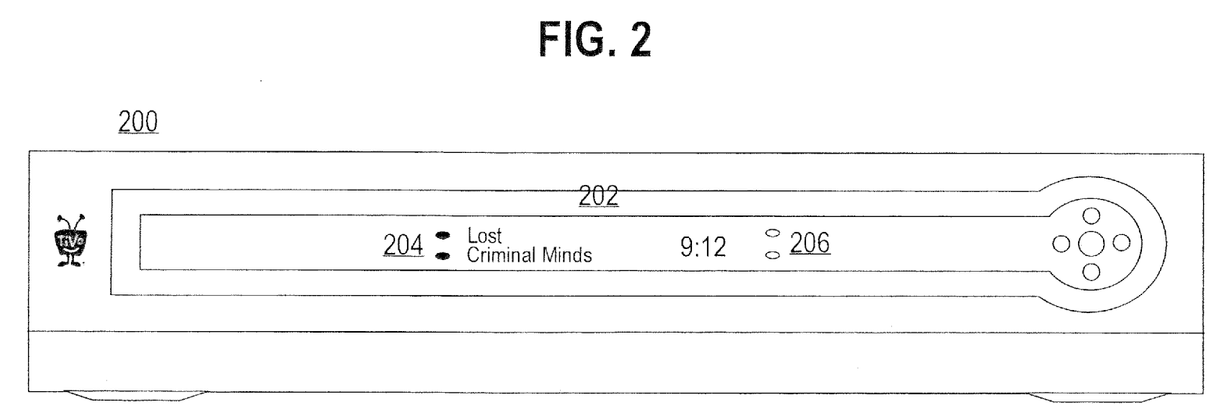
FIG. 2 is a diagram of the front bezel of a DVR showing the location of an informational display, according to an embodiment of the invention.

In an embodiment, a display is placed on the front bezel of a DVR so information of operations on the DVR may be viewed by the user. For example, a program title of content being recorded might be displayed in order to inform the user that the program desired is being recorded. In addition, a clock might be displayed with the program title. An example of the location of the display is shown in FIG. 2. In FIG. 2, a front bezel 200 is shown of a DVR client. The display 202 is in the center of the front bezel and displays the program title of recordings being made, "Lost," "Criminal Minds," and the current time "9:12." To the left of the display are two red LED indicators 204. These indicators illuminate when recordings are occurring on the DVR. On the right, there are also two LED indicators 206. The blue LED indicator on the top is illuminated when a recording from the network is taking place. A recording from the network may be content that is being downloaded from a local network or from the service provider. The orange LED on the bottom is illuminated fully when the telephone line is in use, and also flickers when the remote control is in use. A telephone line may be used to send and synchronize information with the DVR client and the service provider. The flickering from a remote control takes precedence over full illumination when the telephone line is in use.

The informational display may also display information other than the program title of the television show being recorded. Other information that might be displayed include, but are not limited to, the current function or operation being performed on the DVR or the program title of the television program being played. Still other examples might be the format of the video that is being played. These include, but not limited to, "480i," "480p," "720i," "720p," "1080i," "1080p," or any other formats in which programs may be displayed. These video formats describe the resolution of the video and also whether the video is shown in progressive ("p"), or in interlaced ("i") format.

The informational display may be constructed out of any material that allows a user to view information. For example, the display might be a light emitting diode ("LED") display or liquid crystal display ("LCD"). In an embodiment, the display is an organic light emitting diode ("OLED") display. An OLED is an LED whose electroluminescent layer, or material that emits light in response to an electric current, comprises a film of organic compounds. The layer usually contains a polymer substance that allows suitable organic compounds to be deposited. They are deposited in rows and columns and the resulting matrix of pixels is able to emit light of different colors. In an embodiment, the display screen on the front bezel of the DVR has a resolution of 288 by 48. This means that there are 288 pixels for the width and 48 pixels for the height. The resolution of the display screen may vary from implementation to implementation.

Figure 3A:
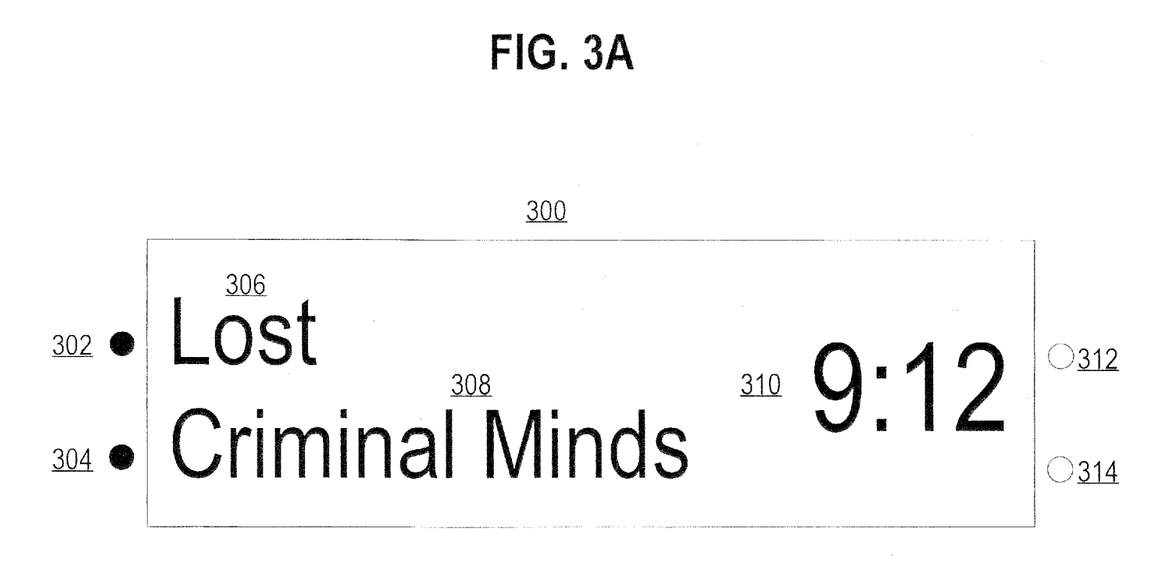
FIG. 3A is a diagram of an informational display showing two simultaneous recordings, according to an embodiment of the invention.

An example of a close-up view of an information display is shown in FIG. 3. Located on the front bezel of the DVR, the display 300 is an OLED display. The display 300 is surrounded by four LED indicators, two on the left and two on the right. The LED indicators on the left 302 and 304, are red and light up to indicate that a program is being recorded by the DVR. LED indicator 302 illuminates when a first recording is being made. LED indicator 304 illuminates when a second recording is being made. LED indicator 312 is a blue LED and indicates that a network recording is occurring. LED indicator 314 is an orange LED and indicates that the DVR is using the telephone line and LED indicator 314 also flickers when the remote control is in use.

In the example, the DVR is able to record two different programs simultaneously. In other embodiments, the DVR is able to record more than two programs simultaneously and more than two titles may appear on the display. In FIG. 3, a first recording is being made of the television show "Lost" 306. The LED indicator 302 is also illuminated indicating that the first recording is taking place. A second recording is being made of the television show "Criminal Minds" 308 and LED indicator 304 is illuminated indicating that the second program is being recorded. On the right side of the screen is a clock 310 that shows the current time of "9:12."

In an embodiment, a clock is shown to the right side of the display and the program titles are shown on the left side of the display. In another embodiment, the clock is shown on the left side of the display and the program titles are shown on the right side of the display. These layouts may vary from implementation to implementation.

Figure 3B:
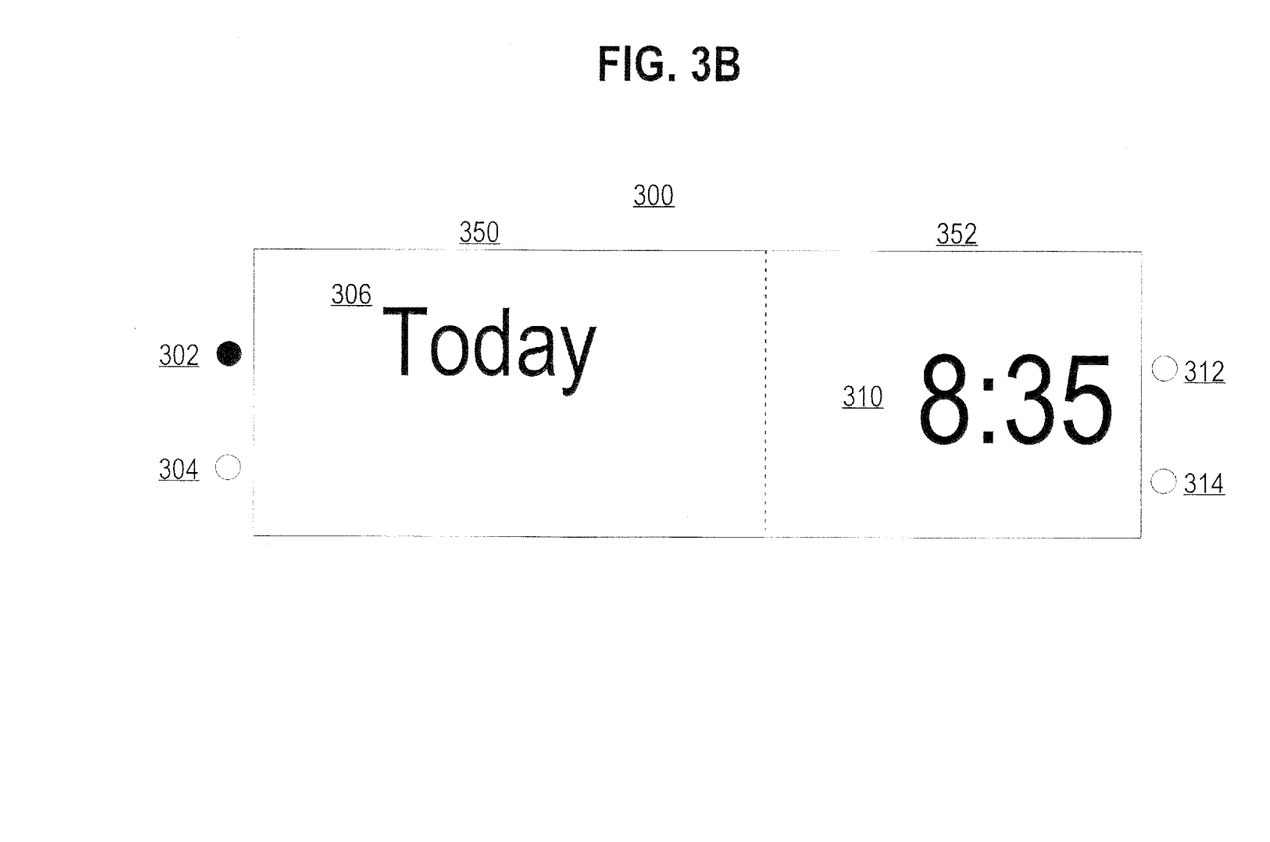
FIG. 3B is a diagram of an informational display showing one recording, according to an embodiment of the invention.

FIG. 3B shows another informational display with only a single recording in progress. As shown in FIG. 3B, display 300 is surrounded by the 4 LED indicators 302, 304, 312 and 314. In FIG. 3B, only a single recording is made of the television program "Today" 316. As a result, only LED indicator 302 is illuminated to indicate that a first recording is being made. The clock 310 appears on the right side of the display showing the current time of "8:35."

3.1 Anti-Aging Techniques

The use of plasma and OLED displays may result in the failure of certain pixels within the display from normal use. In plasma displays, which are phosphor-based electronic displays, the display of graphical elements over a prolonged amount of time may create a permanent ghost-like image of these elements. The phosphor compounds that emit the light of the display lose luminosity, or the brightness intensity, with use. As a result, if certain areas of the display are used more frequently than others, then over time the lower luminosity areas become visible and "burn-in" occurs.

Pixels in OLED displays have a designated lifetime because the organic materials in the OLED break down after a specified usage. In time, the pixels burn out and no longer emit light correctly. What results is a display with certain pixels unable to display a part of the image. The ambient temperature of the operating environment of the OLED is also important. As temperature increases, the rate of pixel decay increases. In an embodiment, techniques are used to lengthen the life of the display by minimizing the occurrence of pixel burnout. Though these techniques are described with relation to OLED displays, these techniques may be used for any display where pixel burn-in or failure might occur.

3.1.1 Shifting Displayed Items

In an embodiment, information shown on the display is shifted within the display area so that the same pixels are not continuously used. For example, a program title is displayed on the left side of the display and a clock is shown on the right side of the display. If the information is displayed in the same locations of the display, some pixels (such as the ":" in the clock) would be continuously illuminated while other pixels would rarely or never be illuminated. After the organic material in the illuminated pixel breaks down, the pixel fails and no longer illuminates when activated by electric current. What results is a display where parts of displayed text are not illuminated correctly.

In an embodiment, information shown on the display is slowly shifted around the display area so that the movement is not readily detectable to the user. For example, the information may be slowly shifted to the right, pixel by pixel, with each shift occurring once per day. The shift or movement resulting from the shift of the information displayed may be in any direction but the purpose of the movement is to limit the amount of time that each pixel is in use.

In an embodiment, the information displayed is shifted so that each pixel uses a maximum of a specified duty cycle. A duty cycle is the proportion of time during which a pixel is illuminated. For example, if a pixel is illuminated for ten minutes, then is shut off for 90 minutes, then the pixel is illuminated for ten out of 100 minutes. Ten out of 100 minutes is 10/100 of the time, and the duty cycle is 10/100, or ten percent. In an embodiment, the specified duty cycle is 10.6%. Under this circumstance, movements of the displayed information would be such that no single pixel is luminous, or in use, for more than 10.6% for a given period of time.

In an embodiment, the display is logically split into two sections. An example is shown in FIG. 3B. One section is the right section 352 that displays the clock and the left section 350 that displays the program title. The information displayed in a section is moved only within the section to increase the life of the display. For example, the clock would be moved only within the display section of the clock. The program title would be moved only within the display section of the program title. In another embodiment, the movements of the clock and program title are not limited to the two sections in the display. In yet another embodiment, the movements of the clock and program title are not limited to the two sections in the display but the clock always remains to the right of the program title.

Figure 4:
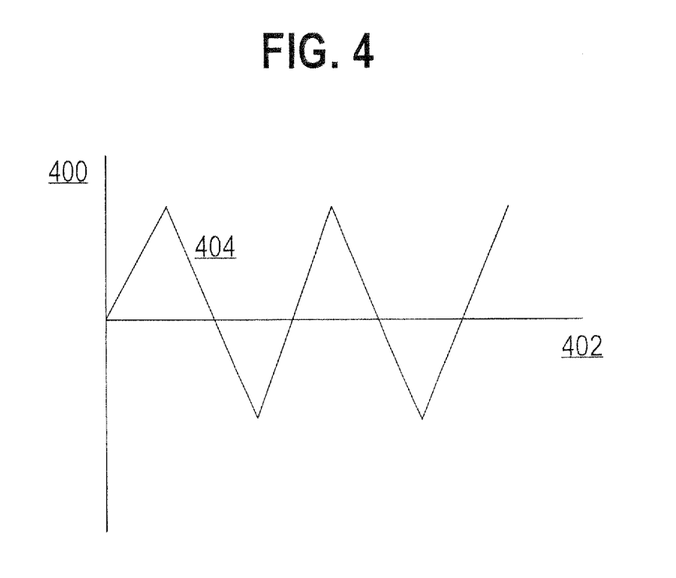
FIG. 4 is a diagram of a triangle wave oscillation movement, according to an embodiment of the invention.

In an embodiment, a clock is displayed without "AM" or "PM." By removing "AM" and "PM," the clock may be moved within a wider area within the display. In an embodiment, the motion of the clock is a rectangle around the edge of the display section with a triangle wave oscillation on the borders of the rectangle. An example of a triangle wave oscillation movement is shown in FIG. 4. In FIG. 4, line 400 represents the y-axis and line 402 represents the x-axis. Line 404 illustrates the movement in a triangle wave oscillation. In another embodiment, the motion of the clock does not follow a specific pattern but maximizes the life of the pixels.

3.1.2 Simulator

In an embodiment, a simulator of the display is used to determine the direction and shape of the shift of the displayed information for the anti-aging mechanism. The simulator measures the amount of time each pixel is illuminated over a certain designated time period. Based upon the results of the simulator, various motions of displayed information might be attempted before determining which particular motion yields an acceptable duty cycle for the pixels.

The simulator calculates the amount of time each pixel is illuminated over a specified time period based on certain underlying variables. Examples of these variables include, but are not limited to, the text or information that is displayed, the length of the text of information that is displayed, the font and size of the text of information that is displayed, whether capital or lower case letters are used, the initial placement of the information on the screen, the size of the display screen, the ambient temperature of the device, the brightness of the displayed text, and the limits of the areas that the information may be shifted. When simulating the program title of recordings, the program titles that are used in the simulator may provide varying results.

In an embodiment, the program titles are the program titles of the television shows that are recorded most frequently according to data provided by the service provider. Other information and program titles used may vary from implementation to implementation.

The tested length of the simulation may also vary. In an embodiment, the simulated length is 1000 days. Under these conditions, each pixel is measured for use over 1000 days to determine each pixel's duty cycle. Within the 1000 days, usage of the display per day may also vary. For example, a DVR may be simulated to be displaying information eight hours per day.

The calculated duty cycle may then be placed in a graph format so that the results may easily be interpreted. For example, pixels with a lower duty cycle are color coded green. Pixels with a moderate duty cycle are color coded yellow. Pixels with a high duty cycle are color coded red. Based on interpretations of the data, the shape and the direction of the shift of information displayed may be changed as well as the frequency of the shift.

In an embodiment, a real-time analysis of pixel use within the display panel is performed to determine the shift of the displayed information. The analysis is performed by the consumer recording device as the information is displayed. This allows the shift of displayed information to be determined by the actual use of pixels in the display panel and not expected use. The consumer recording device, or DVR, calculates the use of each pixel as the pixels are illuminated. If the use of particular pixels is high relative to nearby pixels, then a shift of the displayed information is made to more evenly distribute pixel use throughout the display panel.

3.1.3 Dimming

In an embodiment, the display is dimmed after a specified amount of time in order to lengthen the life of the pixels. The life of an OLED pixel is based upon the length of time that the OLED pixel is illuminated and the degree of illumination. For example, if a pixel of an OLED is in use at the highest brightness, then the OLED pixel would fail more quickly than an OLED pixel is use at a much lower brightness. The display may become bright for eight seconds when new information is displayed or when a user selects the "Info" button on the remote control or DVR bezel. After the eight seconds, the display is dimmed.

Brightness, or luminance, may be based upon the measurement, the nit. A "nit" is defined as the candelas per square meter ($cd/m^2$). Computer displays, for example, may have luminances of 50 to 300 nits.

In an embodiment, the display is shown with a luminance of 35 nits, and then after a short period of time, the display is dimmed to 5 nits. The value of luminance may vary from implementation to implementation in bright mode to dim mode. In an embodiment, the specified length of time from bright mode to dim mode is five to six seconds. This value may also vary from implementation to implementation.

4.0 Implementation Mechanisms

Figure 5:
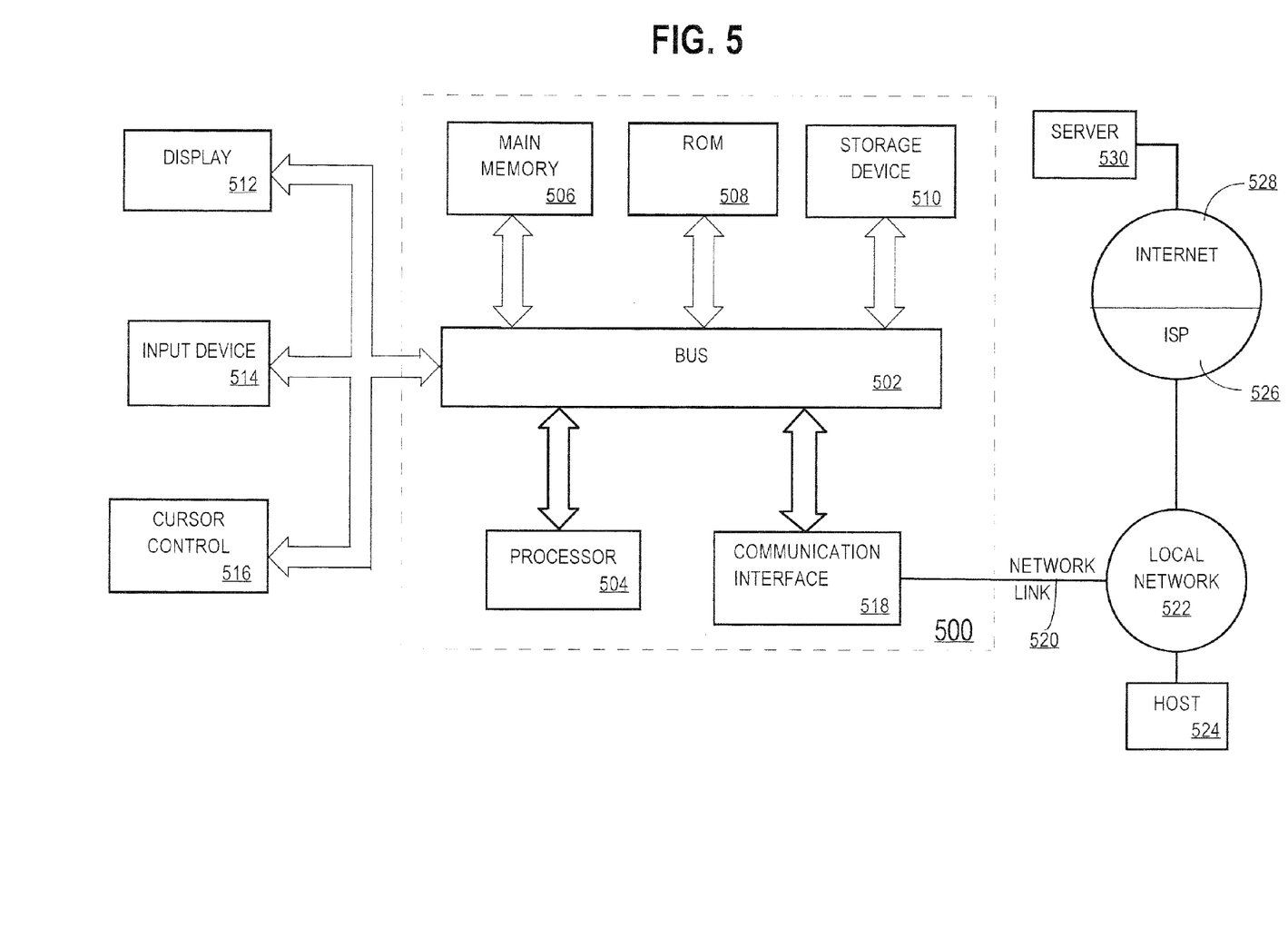
FIG. 5 is a block diagram of a system on which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor

504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave. In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:
1. A method, comprising:
 causing to display, on a location of a display screen, information related to an operation of a consumer recording device;
 determining an amount of time during which a pixel in a plurality of pixels is illuminated on the display screen;

determining whether the amount of time during which the pixel is illuminated on the display screen exceeds a specified time amount, the specified time amount being based on a maximum of a duty cycle for illumination of the pixel;

in response to determining that the amount of time during which the pixel is illuminated on the display screen exceeds the specified time amount, moving the location of the information on the display screen;

wherein the method is performed by one or more computing devices.

2. The method of claim 1, further comprising:
displaying the information displayed on the display screen at a lesser brightness after a specified amount of time.

3. The method of claim 1, wherein the display screen is an OLED display.

4. The method of claim 1, wherein the consumer device is a digital media device.

5. The method of claim 1, wherein the information displayed on the display screen comprises one or more of a program title of content being recorded, a program of title of content being played, a function being performed by the consumer recording device, or a resolution of content being played.

6. The method of claim 1, wherein further comprises:
computing an individual amount of time each pixel on the display screen is illuminated over a specified time period.

7. The method of claim 1, wherein the amount of time during which the pixel is illuminated on the display screen is less than a specified time period.

8. The method of claim 1, wherein moving the location of the information is in a rectangular pattern around edges of the display screen with a triangle wave oscillation on borders of the rectangle.

9. The method of claim 1, wherein the display screen comprises two sections.

10. The method of claim 9, wherein the information related to an operation of a consumer recording device is displayed in the first section and a clock is displayed in the second section.

11. The method of claim 10, wherein moving the location of the information related to an operation of a consumer recording device is within the first section and moving the location of the clock is within the second section.

12. The method of claim 1, wherein determining whether the amount of time during which the pixel is illuminated on the display screen exceeds the specified time amount is made by a simulator.

13. A non-transitory computer-readable medium storing one or more sequences of instructions which, when executed by one or more processors, causes the one or more processors to perform the steps:

causing to display, on a location of a display screen, information related to an operation of a consumer recording device;

determining an amount of time during which a pixel in a plurality of pixels is illuminated on the display screen;

determining whether the amount of time during which the pixel is illuminated on the display screen exceeds a specified time amount, the specified time amount being based on a maximum of a duty cycle for illumination of the pixel;

in response to determining that the amount of time during which the pixel is illuminated on the display screen exceeds the specified time amount, moving the location of the information on the display screen.

14. The non-transitory computer-readable medium of claim 13, wherein the one or more sequences of instructions further comprise instructions which, when executed by one or more processors, causes the one or more processors to perform:

displaying the information displayed on the display screen at a lesser brightness after a specified amount of time.

15. The non-transitory computer-readable medium of claim 13, wherein the display screen is an OLED display.

16. The non-transitory computer-readable medium of claim 13, wherein the consumer device is a digital media device.

17. The non-transitory computer-readable medium of claim 13, wherein the information displayed on the display screen comprises one or more of a program title of content being recorded, a program of title of content being played, a function being performed by the consumer recording device, or a resolution of content being played.

18. The non-transitory computer-readable medium of claim 13, wherein the one or more sequences of instructions further comprise instructions which, when executed by one or more processors, causes the one or more processors to perform computing individual amount of time each pixel on the display screen is illuminated over a specified time period.

19. The non-transitory computer-readable medium of claim 13, wherein the amount of time during which the pixel is illuminated on the display screen is less than a specified time period.

20. The non-transitory computer-readable medium of claim 13, wherein moving the location of the information is in a rectangular pattern around edges of the display screen with a triangle wave oscillation on borders of the rectangle.

21. The non-transitory computer-readable medium of claim 13, wherein the display screen comprises two sections.

22. The non-transitory computer-readable medium of claim 21, wherein the information related to an operation of a consumer recording device is displayed in the first section and a clock is displayed in the second section.

23. The non-transitory computer-readable medium of claim 22, wherein moving the location of the information related to an operation of a consumer recording device is within the first section and moving the location of the clock is within the second section.

24. The non-transitory computer-readable medium of claim 13, wherein determining whether the amount of time during which the pixel is illuminated on the display screen exceeds the specified time amount is made by a simulator.

* * * * *